US011585346B2

(12) United States Patent
Bareis et al.

(10) Patent No.: US 11,585,346 B2
(45) Date of Patent: Feb. 21, 2023

(54) PUMP ASSEMBLY, IN PARTICULAR FOR SUPPLYING A SLIDE RING SEAL ASSEMBLY

(71) Applicant: EagleBurgmann Germany GmbH & Co. KG, Wolfratshausen (DE)

(72) Inventors: Markus Bareis, Pflugdorf (DE); Christian Eisfeld, Wolfratshausen (DE); Martin Ertl, Holzhausen (DE); Christoph Karner, Geretsried (DE); Hans-Georg Scherer, Geretsried (DE); Berthold Schulten, Geretsried (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 206 days.

(21) Appl. No.: 16/761,018

(22) PCT Filed: Nov. 12, 2018

(86) PCT No.: PCT/EP2018/080911
§ 371 (c)(1),
(2) Date: May 1, 2020

(87) PCT Pub. No.: WO2019/096729
PCT Pub. Date: May 23, 2019

(65) Prior Publication Data
US 2021/0025396 A1    Jan. 28, 2021

(30) Foreign Application Priority Data

Nov. 16, 2017   (DE) ..................... 10 2017 220 437.0

(51) Int. Cl.
*F04D 3/02* (2006.01)
*F04D 1/00* (2006.01)
(Continued)

(52) U.S. Cl.
CPC ............... *F04D 3/02* (2013.01); *F04D 1/006* (2013.01); *F04D 1/025* (2013.01); *F04D 13/026* (2013.01);
(Continued)

(58) Field of Classification Search
CPC ........ F04D 3/02; F04D 13/024; F04D 13/026; F04D 13/12; F04D 29/041; F04D 1/025; F16J 15/3484
See application file for complete search history.

(56) References Cited

U.S. PATENT DOCUMENTS 367,564   A   *   8/1887   Wade .................... F04D 3/02
                                                          415/100
1,213,461 A   *   1/1917   Cooper .................. F04D 3/02
                                                          415/74
(Continued)

FOREIGN PATENT DOCUMENTS

BR        8405981   A      8/1985
CN      101504034   A      8/2009
(Continued)

OTHER PUBLICATIONS

Machine Translation of DE 1165144.*
(Continued)

*Primary Examiner* — Christopher S Bobish
(74) *Attorney, Agent, or Firm* — Locke Lord LLP; Scott D. Wofsy; Michael J. Pollack

(57) ABSTRACT

The invention relates to a pump assembly, especially of a mechanical seal assembly, for supplying a fluid, especially to a mechanical seal (2a, 2b), comprising exactly one drive (11) comprising a drive shaft (24), a first axial pump (21), which conveys the fluid in the axial direction (X-X) of the drive shaft, a second axial pump (22), which conveys the fluid in the axial direction of the drive shaft, and a radial (Continued)

Figure 1:
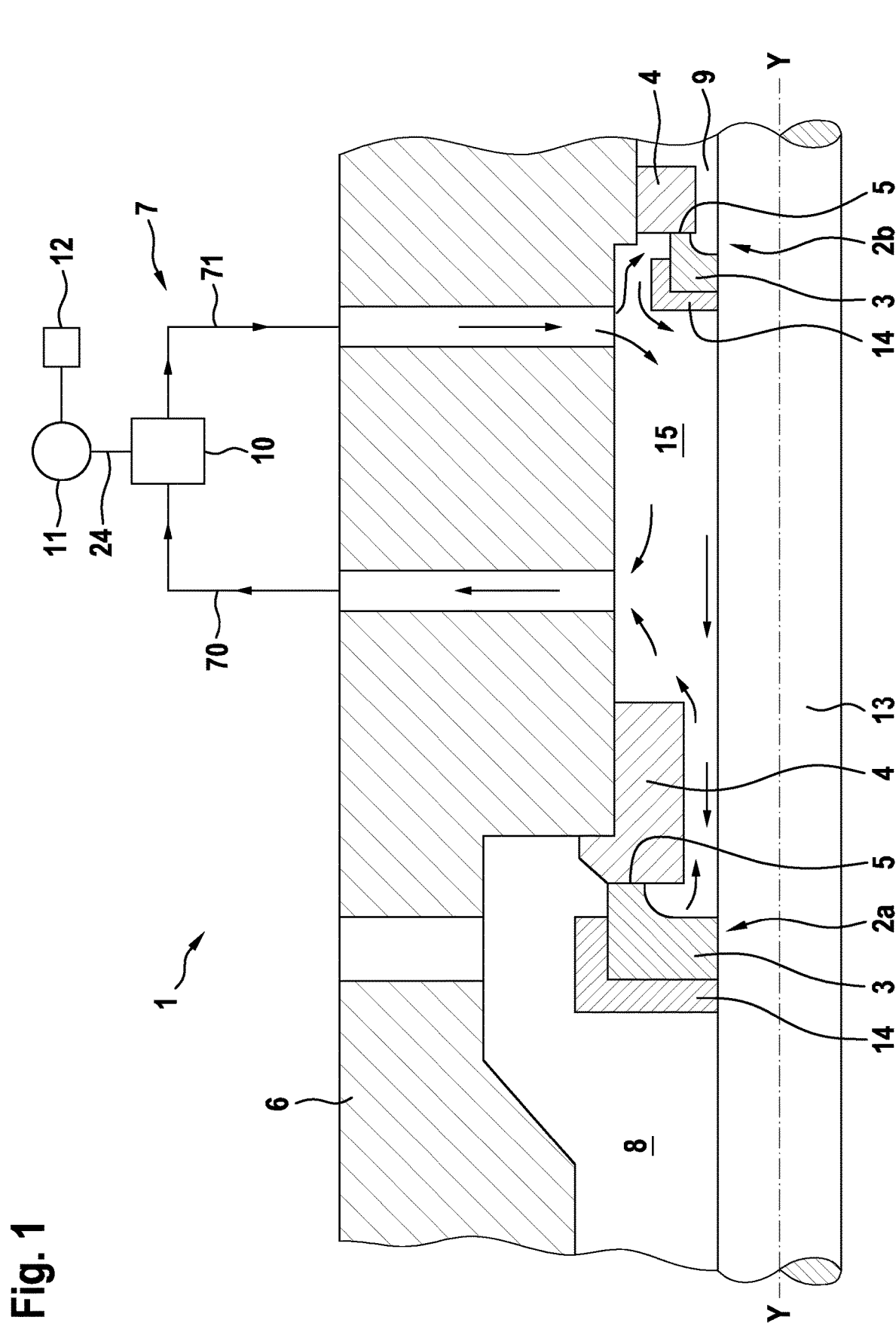

pump (23), which conveys the fluid in the radial direction (R) of the drive shaft, wherein the first axial pump (21) and the second axial pump (22) are arranged in front of the radial pump (23) in the flow-through direction (B) of the fluid across the pump assembly, and wherein the drive (11) simultaneously drives the first axial pump (21), the second axial pump (22) and the radial pump (23).

13 Claims, 2 Drawing Sheets

(51) Int. Cl.
  *F04D 13/02* (2006.01)
  *F04D 1/02* (2006.01)
  *F04D 13/12* (2006.01)
  *F04D 29/041* (2006.01)
  *F16J 15/34* (2006.01)

(52) U.S. Cl.
  CPC ............ *F04D 13/12* (2013.01); *F04D 13/024* (2013.01); *F04D 29/041* (2013.01); *F16J 15/3484* (2013.01)

(56) References Cited

U.S. PATENT DOCUMENTS

| | | | | | |
|---|---|---|---|---|---|
| 1,586,978 | A | * | 6/1926 | Dorer | F04D 29/2277 415/99 |
| 3,176,621 | A | * | 4/1965 | McClellan | B63H 11/08 415/72 |
| 3,614,181 | A | * | 10/1971 | Meeks | F16C 32/0425 310/90.5 |
| 3,817,653 | A | * | 6/1974 | Onal | F04D 1/006 415/217.1 |
| 3,953,150 | A | * | 4/1976 | Onal | F04D 29/165 416/175 |
| 4,080,112 | A | * | 3/1978 | Zimmermann | F04D 13/025 415/218.1 |
| 5,507,629 | A | * | 4/1996 | Jarvik | F16C 39/063 417/423.12 |
| 5,695,471 | A | * | 12/1997 | Wampler | H02K 7/09 417/423.1 |
| 9,062,686 | B2 | * | 6/2015 | Meuter | F16C 33/74 |
| 11,162,497 | B2 | * | 11/2021 | Brunvold | F04D 7/00 |
| 2009/0306771 | A1 | | 12/2009 | Hidaka et al. | |
| 2013/0330219 | A1 | * | 12/2013 | LaRose | F04D 29/058 417/420 |
| 2015/0110642 | A1 | * | 4/2015 | Dahouk | F04D 29/5806 417/16 |

FOREIGN PATENT DOCUMENTS

| | | |
|---|---|---|
| CN | 105408649 A | 3/2016 |
| DE | 1165144 B | 3/1964 |
| DE | 202006011223 U1 | 9/2006 |
| FR | 2672344 A1 | 8/1992 |
| JP | H10270243 A | 10/1998 |

OTHER PUBLICATIONS

Office Action issued in Chinese Patent Application No. CN2018800729198.

International Search Report issued in PCT/EP2018/080911, dated Feb. 4, 2019.

* cited by examiner

PUMP ASSEMBLY, IN PARTICULAR FOR SUPPLYING A SLIDE RING SEAL ASSEMBLY

CROSS-REFERENCE TO RELATED APPLICATIONS

This application is a U.S. National Phase Application filed under 35 U.S.C. § 371, based on International Patent Application No. PCT/EP2018/080911, filed Nov. 12, 2018, which claims priority to German Patent Application No. 10 2017 220 437.0, filed on Nov. 16, 2017. The entire contents of these applications is incorporated herein by reference in their entireties.

The invention relates to a pump assembly, especially a mechanical seal assembly for supplying the mechanical seal assembly with a fluid, which is guided to the sealing gap between slide rings of the mechanical seal. Moreover, the present invention relates to a mechanical seal assembly comprising such a pump assembly.

Mechanical seal assemblies are known in prior art in various configurations. A gaseous or liquid barrier medium is used therein, which is introduced into the sealing gap at the sliding surfaces between a rotating slide ring and a stationary slide ring. Basically, any kind of pump may be used for conveying the barrier medium, as usually only a small differential pressure between the pressure of the product to be sealed and the pressure of the sealing medium exists to keep any leakage across the sealing gap of the mechanical seal assembly as low as possible. So far, piston pumps or gear pumps have been used for pressure generation of the sealing medium. So far, a redundant arrangement comprising a second pump has simply been used at higher differential pressures between the sealing medium and the product to be sealed. However, this results in excessively high costs for the entire barrier medium system.

It is thus the object of the present invention, to provide a pump assembly, which is able to generate higher pressures while simultaneously exhibiting simple design and low-cost manufacturability. It is another object of the present invention, to provide a mechanical seal having improved design for supplying a fluid to the mechanical seal assembly.

This object will be solved by a pump assembly having the features of claim 1 and a mechanical seal assembly having the features of claim 14. Preferred embodiments are the subject of the subclaims.

The pump assembly according to the invention of a mechanical seal assembly for supplying a fluid to a mechanical seal has the advantage that exceptionally compact design of the pump assembly will be allowed. This approach allows several pumping stages to be integrated in the pump assembly. The pump assembly comprises exactly one drive comprising a drive shaft, a first and a second axial pump and a radial pump. Thus, three pumps are provide in total, the first and second axial pump conveying fluid in the axial direction of the drive shaft, and the radial pump conveying fluid in the radial direction of the drive shaft. The first and second axial pump are arranged in front of the radial pump, in the flow-through direction of the fluid across the pump assembly. The only drive simultaneously drives both the first and second axial pumps and the radial pump. Thus, only one common drive is provided for all three pumping stages. This allows especially simple and low-cost design of a compact pump assembly.

Preferably, the pump assembly comprises a magnetic coupling comprising an input part having a first permanent magnet, a fixed hollow cylinder and an output part having a second permanent magnet. The hollow cylinder is arranged between the drive part and the output part and is connected to a pump housing for example. This configuration using a magnetic coupling allows easy separation between the fluid and the atmosphere. This allows external contamination of the mechanical seal assembly fluid to be avoided.

Preferably, the drive part of the magnetic coupling is the drive shaft of the pump assembly drive. As a result, the number of components may be reduced and an even more compact design may be achieved.

It is further preferred for the first permanent magnets to be offset in the direction of a central axis of the input shaft by a distance A from the second permanent magnets located at the output part. This results in only partial overlapping between the first and second permanent magnets. Preferably, the first and second permanent magnets are of the same length in axial direction.

According to another preferred embodiment of the invention, the configuration of the pump assembly is such that the first axial pump conveys in a first axial direction and the second axial pump conveys in a second axial direction opposite to the first axial direction. This allows the axial forces acting on the pump assembly to be balanced by the first and second axial pump. Preferably, the design is such that the axial forces acting against each other completely compensate each other. Preferably, the designs of the first and second axial pump are identical.

A particularly simple and compact design is achieved if the first and second axial pump and the radial pump are arranged directly at the output part of the magnetic coupling.

It is especially preferred for the first and second axial pump to be a conveying thread pump. Preferably a conveying thread is arranged on both the rotating and the stationary part. Alternatively, a conveying thread is only arranged at one part, i.e. either the rotating part or the stationary part. It is especially preferred for conveying thread pumps to have the same length in the axial direction.

According to another preferred embodiment of the invention, the pump assembly preferably comprises a monobloc pump housing comprising an inlet and an outlet. The monobloc pump housing allows the first and second axial pump and the radial pump to be configured such that they may be provided as a pre-assembled unit and simply be inserted into the monobloc pump housing.

Preferably, one feed direction to the inlet of the pump assembly and one discharge direction in the outlet of the pump assembly is the same. This minimizes losses by diverting the flow.

Preferably, the pump assembly furthermore comprises a fluid flow divider, which divides a fluid flow that is being fed into two sub-flows. A first sub-flow leading to the first axial pump and a second sub-flow leading to the second axial pump. Preferably, the fluid flow divider is arranged immediately behind the inlet in the pump housing.

Preferably, the pump assembly further comprises a control unit which is adapted to control a drive speed of the one drive to thus control a flow rate of the pump assembly.

Preferably, the pump assembly comprises a first and second radial bearing to support the output part at the hollow cylinder. Preferably, the fluid also serves as a lubricating medium for the first and second radial bearing. It is furthermore preferred to have only one axial bearing, especially preferably adjacent to one of the radial bearings, so as to realize axial bearing of the output part of the magnetic coupling. This is especially feasible if the first and second permanent magnets of the magnetic coupling are arranged offset to each other in the axial direction, so that axial force is only present in one direction between the input part and the output part, due to the arrangement of the permanent magnets.

Furthermore, the present invention relates to a mechanical seal assembly, comprising at least one first mechanical seal comprising a rotating and a stationary slide ring, the slide rings defining a sealing gap between the sliding surfaces thereof, and a pump assembly according to the invention. Preferably, the mechanical seal assembly is configured as a tandem design, comprising a first and a second mechanical seal in series. With the tandem design, fluid will be fed to a space between the first and second mechanical seal.

Figure 2:
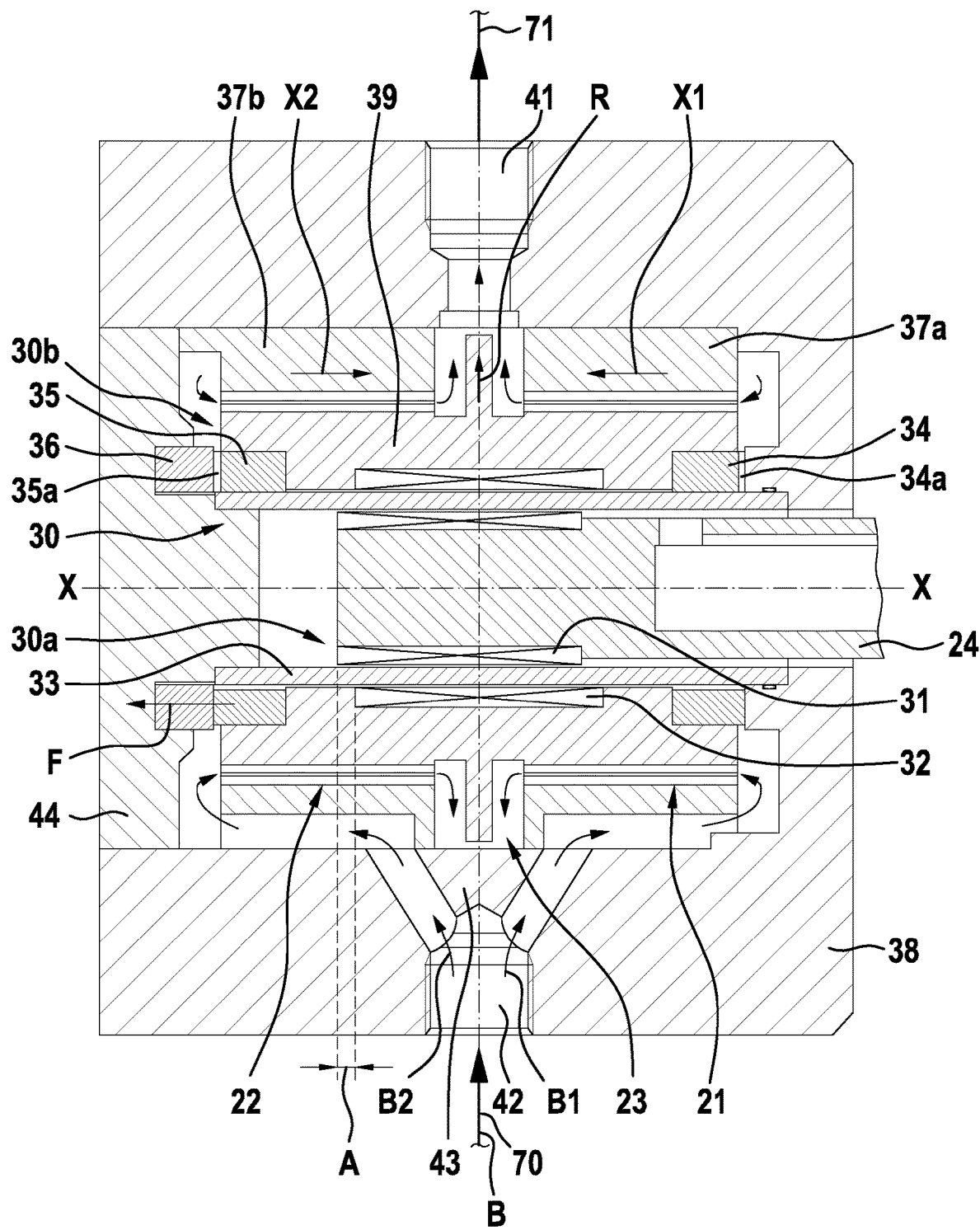

In the following, a preferred example embodiment of the invention will be described in detail while making reference to the accompanying drawing, wherein:

FIG. 1 is a schematic view of a mechanical seal assembly comprising a pump assembly according to a preferred embodiment of the invention, and FIG. 2 is a sectional view showing the pump assembly of FIG. 1 in detail.

As it may be seen from FIG. 1, the mechanical seal assembly 1 comprises a first mechanical seal 2a and a second mechanical seal 2b, for sealing a product side 8 with a product to be sealed from an atmosphere side 9. Herein, a tandem arrangement is shown, wherein the two mechanical sealings 2a, 2b serially seal towards a central shaft axis Y-Y at a common shaft 13.

For operating the two mechanical sealings 2a, 2b, a fluid circuit 7 is arranged, which uses a fluid or a barrier medium, for example a liquid oil or the like, respectively.

In this embodiment, the first and second mechanical seals 2a, 2b are similarly designed, each comprising a rotating slide ring 3 and a stationary slide ring 4, defining a sealing gap 5 between the sliding surfaces thereof. The rotating slide ring 3 are fixed at the shaft 13 using a sleeve-shaped retention member 14. The stationary slide ring 4 are commonly fixed in a seal housing 6.

As it may be seen from FIG. 1, the fluid circuit 7 comprises a suction line 70 and a pressure line 71. Moreover, a pump assembly 10 is arranged in the fluid circuit 7, to pump the fluid in a closed circuit. The pump assembly 10 comprises one single drive 11, which is controlled by use of a control unit 12.

As it may be seen from FIG. 1, the fluid circuit 7 leads to a space 15 between the first mechanical seal 2a and the second mechanical seal 2b. The fluid is fed to the vicinity of the sealing gap 5 to ensure sealing at the sealing gaps 5. A pressure of the fluid is slightly higher than a pressure of the product on the product side 8. Leakage of the product towards the atmosphere side 9 will thus be avoided.

The pump assembly 10 may be seen in detail from FIG. 2. As it may be seen from FIG. 2, the pump assembly 10 comprises a first axial pump 21, a second axial pump 22 and a radial pump 23. The first and second axial pump 21, 22 are formed as conveying thread pumps, wherein a conveying thread is provided both at the rotating portion and the stationary portion of the two axial pumps 21, 22.

The first and second axial pump 21, 22 are similarly designed, wherein a conveying direction of the first axial pump in a first axial direction is X1 and the conveying direction of the second axial pump in an opposite axial direction is X2.

As it may further be seen from FIG. 2, the radial pump 23 is arranged in the axial direction X-X of the pump assembly between the first and second axial pump 21, 22. The radial pump 23 conveys the fluid in the radial direction R.

As it may further be seen from FIG. 2, the pump assembly 10 comprises a magnetic coupling 30. The magnetic coupling 30 is arranged between the drive 11 and the two axial pumps 21, 22 as well as the radial pump 23. The magnetic coupling is for transmitting a drive torque to the three pumping stages of the pump assembly 10.

As it is shown in FIG. 2, the magnetic coupling 30 comprises a plurality of first permanent magnets 31 and a plurality of second permanent magnets 32. A fixed hollow cylinder 33 is arranged between the permanent magnets 31, 32. The hollow cylinder 33 is connected to a pump housing 38. Thus, the magnetic coupling 30 allows media separation between the fluid and the atmosphere.

The magnetic coupling 30 comprises an input part 30a and an output part 30b. The input part 30a comprises a drive shaft 24 of the drive 11 as well as first permanent magnets 31. The output part 30b comprises the second permanent magnets 32 as well as a rotary sleeve 39. The second permanent magnets 32 are arranged at the rotary sleeve 39.

Moreover, two fixed sleeves 37a, 37b are arranged at the outer circumference of the rotary sleeve 39. Herein, the axial pumps 21, 22 are formed as conveying threads between the fixed sleeves 37a, 37b and the rotary sleeve 39. The radial pump 23 is arranged between the two fixed sleeves 37a, 37b. In FIG. 2, the radial pump is only shown schematically and may comprise a plurality of vanes or the like, so as to pump the barrier medium in the radial direction R in relation to the central axis into an outlet 41 formed in the pump housing 38.

In the pump housing 38, an inlet 42 is additionally provided, wherein an inlet direction in the inlet 42 is equal to an outlet direction in the outlet 41, namely radial. As it may be seen from FIG. 2, the inlet 42 and the outlet 41 are also located on a common axis perpendicular to the axial direction X-X.

A first radial bearing 34 and a second radial bearing 35 is provided to support the rotating sleeve 39. This involves radial bearing of the rotation sleeve 39 opposite to the hollow cylinder 33. As it is shown in FIG. 2, grooves 34a and 35a are provided at the end faces of the two radial bearings 34 and 35 for feeding fluid to the bearing surfaces as a lubricating agent for the radial bearings. Moreover, exactly one axial bearing 36 is provided, which is arranged adjacent to the second radial bearing 35.

The axial bearing 36 is arranged in a closing member 44, which closes the pump housing 38.

As it is further shown in FIG. 2, an arrangement of the first permanent magnets 31 in the axial direction is offset to an arrangement of the second permanent magnets 32. The first permanent magnets 31 are offset to the second permanent magnets 32 by a distance A in the axial direction X-X. Axial pretension of the rotary sleeve 39 will be exerted by the magnetic forces such that only exactly one axial bearing 36 will be required.

Operation of the pump assembly 10 is performed as follows. When the drive 11 is driven by the control unit 12, the drive shaft 24 and thus the first permanent magnets 31 will rotate. Due to the magnetic forces acting on the second permanent magnets 32, the rotary sleeve 39 also starts rotating. In this way, suction of the fluid via the inlet 42 to a fluid flow divider 43 occurs. As indicated by the arrows in FIG. 2, the fluid flow B splits in a first sub-flow B1 towards the first axial pump 21 and a second sub-flow B2 towards the second axial pump 22. The fluid then flows from the fluid flow divider 43 to the left and right side, as indicated by the other arrows in FIG. 2, and is reciprocated by 180°, and subsequently enters the first and second axial pump 21, 22. The radial pump 23 is then arranged at the outlet of the first and second axial pump 21, 22, which performs deviation of the fluid by 90° and feeding into the outlet 41.

Thus, the fluid is conveyed to the radial pump 23 arranged between the two axial pumps 21, 22 by the two axial pumps 21, 22. The radial pump then causes deviation of the axially fed fluid in the radial direction R and conveys the fluid into the pressure line 71 via the outlet 41 and towards the slide ring sealings 2a, 2b (cf. FIG. 1).

Thus, three pumping stages are integrated in a pump assembly, providing two axial pumping stages and one radial pumping stage. Herein, the two axial pumping stages are countercurrently formed and are preferably formed as a conveying thread. The countercurrent arrangement of the first and second axial pump 21, 22 allows overcoming the axial forces occurring during conveying. Moreover, the arrangement of the first permanent magnets 31 which is offset in the axial direction X-X in relation to the second permanent magnets 32 ensures that a pretensioning force F will consistently be exerted onto the only axial bearing 36. Due to the arrangement, that pretensioning force F is independent of a rotational speed and independent of a viscosity of the fluid.

The pump assembly 10 according to the invention is very compact and robust and is especially adapted to high pressures up to $200 \times 10^5$ Pa. When the two axial pumps 21, 22 are formed as a conveying thread and closed circuit of the fluid exists, no other safety systems or sealing systems are required to be provided. Moreover, the first and second axial pumps formed as a conveying thread as well as the radial pump ensure that low friction occurs within the fluid during operation, so as to result in low heat development. Another great advantage of the pump assembly 10 according to the invention resides in that control of an amount of fluid being pumped only depends on the speed of the drive and thus may easily be realized using the control unit 12. Furthermore, the one-piece, cross-sectionally U-shaped pump housing 38 allows realization of an easy to mount assembly. Alternatively, the pump housing may also be provided as being multi-part.

Moreover, by using conveying threads as the first and second axial pump 21, 22 circulation of the fluid may be ensured during failure of the pump assembly, until complete shutdown occurs.

LIST OF REFERENCE NUMBERS 1 mechanical seal assembly
2a first mechanical seal
2b second mechanical seal
3 rotating slide ring
4 stationary slide ring
5 sealing gap
6 seal housing
7 fluid circuit
8 product side
9 atmosphere side
10 pump assembly
11 drive
12 control unit
13 shaft
14 retention member for rotating slide ring
15 space
21 first axial pump
22 second axial pump
23 radial pump
24 drive shaft
30 magnet coupling
30a input part
30b output part
31 first permanent magnets
32 second permanent magnets
33 fixed hollow cylinder
34 first radial seal
34a groove
35 second radial seal
35a groove
36 axial bearing
37a fixed sleeve
37b fixed sleeve
38 pump housing
39 rotary sleeve
41 outlet
42 inlet
43 fluid flow divider
44 closing member
70 suction line
71 pressure line
A distance
B flow-through direction of the pump assembly
B1, B2 first and second sub-flow in the pump assembly
F pretensioning force
R radial direction
X1 first axial direction
X2 second axial direction
X-X axial direction (central axis) of the pump assembly
Y-Y central shaft axis

The invention claimed is:

1. A mechanical seal assembly comprising a mechanical seal having a rotating slide ring and a stationary slide ring, defining a sealing gap at sliding surfaces which are opposite to each other, and a fluid circuit having a pump assembly for supplying a fluid to the mechanical seal, comprising:
   exactly one drive comprising a drive shaft;
   a first axial pump, which conveys the fluid in an axial direction of the drive shaft;
   a second axial pump, which conveys the fluid in the axial direction of the drive shaft;
   a radial pump, which conveys the fluid in a radial direction of the drive shaft, wherein the first axial pump and the second axial pump, in flow-through direction of the fluid across the pump assembly, are arranged in front of the radial pump, and wherein the drive simultaneously drives the first axial pump, the second axial pump and the radial pump;
   a magnetic coupling comprising an input part having first permanent magnets, a fixed hollow cylinder and an output part having second permanent magnets,
   wherein the first permanent magnets, in the axial direction of the drive shaft, are offset by a distance in relation to the second permanent magnets, wherein the first permanent magnets partially overlap the second permanent magnets in the radial direction, and wherein the first permanent magnets of the input part exert axial pretension on the second permanent magnets of the output part; and
   exactly one axial bearing disposed within the pump assembly in the direction of the axial pretension of the first permanent magnets of the input part on the second permanent magnets of the output part.

2. The mechanical seal assembly according to claim 1, wherein the input part comprises the drive shaft of the drive.

3. The mechanical seal assembly according to claim 1, wherein the first axial pump conveys the fluid in a first axial direction and the second axial pump conveys the fluid in a second axial direction, which is opposite to the first axial direction.

4. The mechanical seal assembly according to claim 1, wherein the first axial pump, the second axial pump and the radial pump are directly arranged at the output part of the magnet coupling.

5. The mechanical seal assembly according to claim 1, wherein the first axial pump and the second axial pump are formed as conveying thread pumps.

6. The mechanical seal assembly according to claim 1, furthermore comprising a one-piece pump housing, which includes an inlet and an outlet.

7. The mechanical seal assembly according to claim 6, wherein an inlet direction into the inlet is equal to an outlet direction into the outlet.

8. The mechanical seal assembly according to claim 1, furthermore comprising a fluid flow divider, which divide a fed fluid flow into first and second sub-flows, wherein the first sub-flow flows to the first axial pump and the second sub-flow flows to the second axial pump.

9. The mechanical seal assembly according to claim 1, wherein the output part includes a rotary sleeve, where the first axial pump, the second axial pump, the radial pump and the second permanent magnets are arranged.

10. The mechanical seal assembly according to claim 1, furthermore comprising a control unit, which is adapted for controlling a drive speed of the drive, so as to determine a flow rate of the pump assembly.

11. The mechanical seal assembly according to claim 1, wherein the output part comprises;
a first radial bearing;
a second radial bearing.

12. The mechanical seal assembly according to claim 1, comprising a first mechanical seal and a second mechanical seal, which are arranged in series, wherein a barrier medium is fed into a space between the first and second mechanical seals.

13. The mechanical seal assembly of claim 1, wherein the axial pretention is due to an attractive magnetic force.

* * * * *